«12» United States Patent
Jolly et al.

(10) Patent No.: US 8,267,505 B2
(45) Date of Patent: Sep. 18, 2012

(54) INKJET INKSET AND METHODS

(75) Inventors: Jason Jolly, San Diego, CA (US);
Phillip C. Cagle, San Marcos, CA (US);
Radha Sen, San Diego, CA (US); Karen Wytmans Waggoner, Carlsbad, CA (US); Pau Soler Pia, Barcelona (ES);
Howard Doumaux, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 12/808,076

(22) PCT Filed: Dec. 14, 2007

(86) PCT No.: PCT/US2007/087596
§ 371 (c)(1),
(2), (4) Date: Jun. 14, 2010

(87) PCT Pub. No.: WO2009/078853
PCT Pub. Date: Jun. 25, 2009

(65) Prior Publication Data
US 2010/0271433 A1   Oct. 28, 2010

(51) Int. Cl.
*B41J 2/01* (2006.01)

(52) U.S. Cl. .................. 347/100; 347/95; 106/31.13
(58) Field of Classification Search .................. 347/20, 347/54, 95, 100, 105; 106/31.13, 31.6, 31.27; 523/160, 161; 524/556, 570, 590
See application file for complete search history.

(56) References Cited

U.S. PATENT DOCUMENTS

| | | | |
|---|---|---|---|
| 6,698,875 B2 * | 3/2004 | Onishi et al. | 347/100 |
| 6,779,884 B1 | 8/2004 | Ma et al. | |
| 8,142,849 B2 * | 3/2012 | Ohshima et al. | 427/256 |
| 2005/0035995 A1 | 2/2005 | Yazawa et al. | |

* cited by examiner

*Primary Examiner* — Juanita D Jackson

(57) ABSTRACT

There is disclosed an ink set and method for printing an inkjet ink image on a nonporous substrate. The inkset and method comprise one or more inkjet inks comprising at least one first pigment-based inkjet ink having a first colorant load of a pigment and a polymeric latex binder; and at least one second pigment-based inkjet ink having a second colorant load of the pigment and a polymeric latex binder, the second colorant load being less than the first colorant load, and the second pigment-based inkjet ink applied to a substrate in an amount to provide a total ink loading of from about 10 g/m² to about 30 g/m².

17 Claims, 1 Drawing Sheet

INKJET INKSET AND METHODS

CROSS-REFERENCE TO RELATED APPLICATION

The present application is the U.S. National Stage under 35 U.S.C. §371 of PCT/US2007/087596, filed 14 Dec. 2007, the disclosure of which is hereby incorporated herein by reference.

BACKGROUND ART

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging and large format printing for outdoor applications such as banners, signages, displays, posters, billboard and bus wraps.

Various types of inks and printing surfaces are available for inkjet printing. Inkjet ink compositions, which are substantially aqueous-based, when used in combination with non-porous/non-absorbent substrate surfaces such as vinyl, generally suffer from durability issues, including lightfastness, waterfastness, abrasion resistance and weather resistance. In order to overcome these problems, solvent based inks or UV curable inks were developed to be printed on non-absorbing substrates to achieve the desired durability. However, significant environmental, health and safety concerns exist with both of these types of ink, including evaporation of solvent or UV monomer during printing.

Further efforts to overcome durability issues included pretreatment of the media to accept the ink and/or post-treatment to render the image sufficiently waterfast, lightfast, and/or durable for the intended use, thereby increasing the cost.

Thus it would be desirable to provide an aqueous-based inkjet ink set and printing method for a non-absorbent substrate surface having enhanced durability.

MODE(S) FOR CARRYING OUT THE INVENTION

Figure 1:
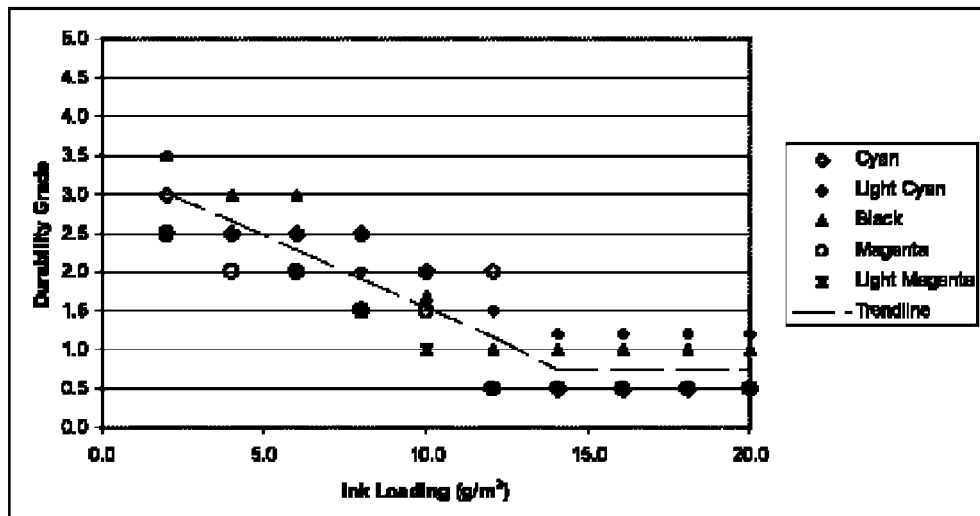
FIG. 1 is a graphical representation of wet rub resistance as a function of ink loading in accordance with an embodiment of the invention.

In the following description, for purposes of explanation, numerous specific details are set forth in order to provide a thorough understanding of one or more aspects of the disclosure herein. It may be evident, however, that one or more aspects of the disclosure herein may be practiced with a lesser degree of these specific details.

The disclosure relates to an inkjet ink set and method of printing a durable inkjet image on nonporous substrates. The inkjet image produced by the inkset and method of the invention can have improved durability, including rub resistance.

The phrase "effective amount," as used herein, refers to the minimal amount of a substance and/or agent, which is sufficient to achieve a desired and/or required effect. For example, an effective amount of a "colorant load" is the minimum amount required in order to create an ink composition having the desired properties associated therewith.

The invention is suited for printing on a variety of substrates, especially on non-absorbing substrates or non-porous media. The terms "low-porous media" or "non-porous media" each refer to print media which has a Bristow Test of less than 2 ml/m2 at a contact time of less than 0.5 s. The Bristow Test (ASTM D5455-93) is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is a function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

The non-absorbing substrates that may be used in the invention include any substrate that is essentially non-porous. They are usually not specially treated for additional liquid absorption. Therefore, these materials have very low or no liquid absorbing capacity. Examples of such non-absorbing substrates are metals such as aluminum, copper, stainless steel and alloy; plastics such as vinyl, polycarbonate, polytetrafluoroethylene (PTFE), polyester, acrylic, polyethylene, polypropylene, polystyrene, cellulose; and other substrates such as ceramics, glass and transparency materials.

In accordance with embodiments of the invention, the inkset and method for printing inkjet ink images for use with the invention typically include a liquid vehicle and a colorant, such as a pigment. Optionally, the liquid vehicle can carry other compositions other than the colorant, such as dispersed polymers or the like. "Liquid vehicle" or "ink vehicle," as used herein, refers to the vehicle in which colorant is placed to form an ink. A wide variety of ink vehicles may be used with the inks and methods according to embodiments disclosed herein. It is to be understood that the ink composition disclosed herein may be an aqueous based ink, an organic based ink, or combinations thereof. Examples of suitable ink vehicles include, but are not limited to water soluble polymers, surfactants (e.g., non-ionic surfactants, ethoxylated nonionic fluorosurfactants, etc.), solvents, cosolvents, buffers, biocides, sequestering agents, viscosity modifiers, surface-active agents, chelating agents, resins, and/or water, and/or combinations thereof.

Various types of pigments can be used, such as self-dispersed pigments and/or polymer dispersed pigments. Self dispersed pigments typically include small molecule or polymeric dispersing agents attached to the surface of the pigment particulates. If a non self-dispersed pigment is used, then the liquid vehicle can further comprise a dispersing agent that associates with the pigment, or the pigment can be physically coated with the dispersing agent. Dispersing agents can be polymers, oligomers, surfactants, small molecules, or the like.

Pigments can include, but are not limited to, black pigment-based inks, neutral gray pigment-based inks and colored pigment-based inks. By "neutral grey ink" it is meant a black pigment ink that may contain other pigments, for example, pigment red, cyan and/or violet, to make the ink neutral. Colored pigment-based inks can include, but are not limited to, cyan and magenta.

The following black pigments can be used in the practice of the invention. This listing is merely illustrative and not intended to limit the disclosure. The following black pigments are available from Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200, Cab-O-JeFM 300, Black Pearls™ 2000, Black Pearls™ 1400, 15 Black Pearls™ 1300, Black Pearls™ 1100, Black Pearls™ 1000, Black Pearls™ 900, Black Pearls™ 880, Black Pearls™ 800, Black Pearls™ 700; the following are available from Columbian: Raven 7000, Raven 5750, Raven 5250, Raven 5000, and Raven 3500; the following are available from Evonik: Color Black FW 200, Color Black FW 2, Color Black FW 2V, Color 20 Black FW 1, Color Black FW 18, Color Black S 160, Color Black FW S 170, Special Black 6, Special Black 5, Special Black 4A, Special Black 4, Printex U, Printex 140U, Printex V, and Printex 140V.

The pigment can also be chosen from a wide range of conventional colored pigments. For the purposes of clarification only, and not for limitation, some exemplary colorants suitable for this purpose are set forth below.

Non-limiting examples of the magenta pigments include pigment red 5, pigment red 7, pigment red 12, pigment red 48:1, pigment red 48:2, pigment red 48:3, pigment red 48:4, pigment red 48:5, pigment red 48:6, pigment red 57, pigment red 112, pigment red 122, pigment violet 19, and the like. Non-limiting examples of the cyan pigments includes pigment blue 1, pigment blue 2, pigment blue 3, pigment blue 15:3, pigment blue 16, pigment blue 22, vat blue 4, vat blue 6, and the like. Examples of suitable pigments for the neutral gray inks include a black pigment and at least one color pigment (e.g., cyan, violet, magenta, red, orange, yellow, green, or blue pigments, or combinations thereof) dispersed therein.

The pigments useful in the invention can have any particle sizes which can be jetted through a print head. In one embodiment, the pigment particles have a particle size of about 30 nm to about 500 nm, and in one embodiment, from about 30 nm to about 150 nm.

In accordance with an embodiment of the invention, the inkset of the invention will comprise an ink cartridge configured to contain a plurality of pigment-based inkjet inks. At least one first pigment-based ink will have a first colorant load. The term "colorant load", as used herein, refers to the amount of pigment present in the ink. In one embodiment, the first pigment-based ink will comprise a colorant load effective to provide a dark ink, for example, magenta, cyan, or black ink. Where the first pigment-based ink comprises magenta, in one embodiment, the first colorant load will range from about 2.0 wt % to about 4.5 wt %. In one embodiment, the first colorant load will range from about 2.5 wt % to about 3.5 wt %. In another embodiment, where the first pigment-based ink comprises cyan, the first colorant load will range from about 1.0 wt % to about 2.5 wt % and in one embodiment, the first colorant load will range from about 1.25 wt % to about 2.0 wt %. In a further embodiment, where the first pigment-based ink comprises black, the first colorant load will range from about 1.0 wt % to about 2.75 wt % and in one embodiment, the first colorant load will range from about 1.3 wt % to about 2.0 wt %.

In an embodiment, at least one second pigment-based ink will have a second colorant load. In one embodiment, the second pigment-based ink will comprise a colorant load effective to provide a light ink of the same pigment as the corresponding dark ink, for example, light magenta, light cyan, or a neutral grey ink. The second pigment-based ink will comprise a second colorant load in a range as measured with a dilution factor of from about 1:3 to about 1:8 of the corresponding first pigment-based ink. In one embodiment, the second pigment-based ink will comprise a second colorant load in a range as measured with a dilution factor of from about 1:3 to about 1:6, and in a further embodiment from about 1:3 to about 1:4. For example, in one embodiment, the amount of magenta pigment has a colorant load sufficient to provide an absorbance maxima, with values being measured at a 1:10,000 dilution at a cell path length of 1 cm, ranging from about 0.01 to about 0.03 at a 1:3-1:8 dilution of the first colorant load of magenta ink, at a wavelength maxima ranging from about 520 nm to about 550 nm (colorant load ranging from about 0.25 wt % to about 1.5 wt %). In another embodiment, the amount of cyan pigment has a colorant load sufficient to provide an absorbance maxima, with values being measured at a 1:10,000 dilution at a cell path length of 1 cm, in a range from about 0.01 to about 0.03 at a 1:3-1:8 dilution of the first colorant load of cyan ink at a wavelength maxima ranging from about 600 nm to about 625 nm (colorant load ranging from about 0.16 wt % to about 0.83 wt %). In another embodiment, the amount of tinted grey pigment has a colorant load sufficient to provide an absorbance maxima, with values being measured at a 1:10,000 dilution at a cell path length of 1 cm, in the range from about 0.01 to about 0.03 at about 500 nm at a 1:3-1:8 dilution of the first colorant load of black ink (colorant load ranging from about 0.16 wt % to about 0.92 wt %).

In one embodiment, the pigment ink of the invention will contain a polymeric latex binder. Binders can be included which act to secure the colorants on the substrate. The term "latex" refers to dispersions comprising a liquid and polymer. Polymeric binders may be either soluble in the ink vehicle or dispersed as particulates. The polymeric particulates can have a particle size range from about 100 nm to about 300 nm, and in one embodiment from about 200 nm to about 300 nm. Binders suitable for use in the invention include, but are not limited to a conjugated diene copolymer latex (e.g., styrene-butadiene copolymer, methyl-methacrylate butadiene copolymer), an acrylic polymer latex, vinyl-based polymer latex, polyurethanes, and polyurethane dispersions, among others. In one embodiment, the binder comprises an acrylic polymer latex.

The amount of binder to be incorporated in the ink will range, in one embodiment, from about 2 wt % to about 15 wt %. In one embodiment the amount of binder will range from about 4 wt % to about 10 wt %, and in another embodiment, the binder will range from about 5 wt % to about 7 wt %. In one embodiment, the first pigment-based inkjet ink will have a first colorant load and a first binder load, and the second pigment-based inkjet ink will have a second colorant load and a second binder load. In one embodiment, the second binder load is less than the first binder load. In such an embodiment the amount of binder of the first binder load will range from about 5 wt % to about 8 wt % and the amount of binder in the second binder load will range from about 2 wt % to about 4 wt %.

In an embodiment of a method of printing an inkjet ink image, a non-porous substrate is established onto which there is jetted a first pigment based-inkjet ink having a first colorant load of a pigment, followed by jetting of a second pigment-based ink having a second colorant load of the same pigment. The amount of the ink established depends, at least in part, on the image to be formed. In one embodiment, the first and second pigment inks are applied at an ink loading of from about 10 g/m2 to about 30 g/m2, and in one embodiment from about 14 g/m2 to about 25 g/m2. Further, it will be understood, that jetting of the first and second pigment inks may occur substantially simultaneously or sequentially.

The image may include alphanumeric indicia, graphical indicia, or combinations thereof Non-limiting examples of suitable inkjet printing techniques include continuous, drop on demand, piezoelectric inkjet, thermal inkjet, or combinations thereof It is to be understood that the image(s) formed from embodiments of the ink sets and methods described herein generally exhibit durable images with improved rub resistance.

To further illustrate embodiment(s) of the present disclosure, various examples are given herein. It is to be understood that these examples are provided for illustrative purposes and are not to be construed as limiting the scope of the disclosed embodiment(s).

EXAMPLES

The general composition of pigment-based inkjet inks made according to the invention is shown in TABLE I, along with ranges of amount of ingredients making up each component. The inkjet ink may be cyan, magenta, or black, depending on the colorant that is used (including the lighter versions of those stated above, i.e., light cyan, light magenta, and gray).

TABLE 1

| Ingredients (%) | Black | Cyan | Magenta | Lt Cyan | Lt Magenta |
|---|---|---|---|---|---|
| Equivalent Pigment Load (in wt %) | 1.60% | 1.80% | 1.97% | 0.75% | 1.03% |
| Black | 0.066 | | | | |
| Cyan | | 0.089 | | 0.037 | |
| Magenta | | | 0.050 | | 0.026 |
| Acrylic latex | 6.00% | 6.00% | 6.00% | 6.00% | 6.00% |
| 2P | 16.00% | 16.00% | 16.00% | 16.00% | 16.00% |
| MPDiol | 9.00% | 9.00% | 9.00% | 9.00% | 9.00% |
| perfluoroalkyl-alcoholethoxylate | 2.00% | 2.00% | 2.00% | 2.00% | 2.00% |
| Water | Balance | Balance | Balance | Balance | Balance |

Example 1

Durability Test
Test Sample Preparation

A non-absorbing vinyl substrate, a multi-purpose inkjet cast vinyl was cut into 0.75 by 4 cm in size and placed on a heated coating block with temperature at about 40° C. The above inks were applied to the heated vinyl substrates described above. Uniform coatings of the inks were obtained. The selected samples were then heated at 90° C. for 1 minute using an infrared lamp.

Dry Rub Resistance Test

A dry rub resistance test can be carried out by rubbing the samples using a CS-10 Weareaser rubber abrasive for 10 passes with a stroke length of 2.0 inches, rub speed of 25 cycles/min, and finger loading of 600 g in the inked area. The color loss in the treated sample area and the color transfer to the cloth can be examined visually and a rating of the dry rub resistance is given as follows on a scale of 0 to 5. 0:0=no damage, 1=gloss loss, 2=0% to 20% colorant loss, 3=20% to 50% colorant loss, 4=50% to 80% colorant loss, and 5=>80% colorant loss.

Wet Rub Resistance Test

Figure 2:
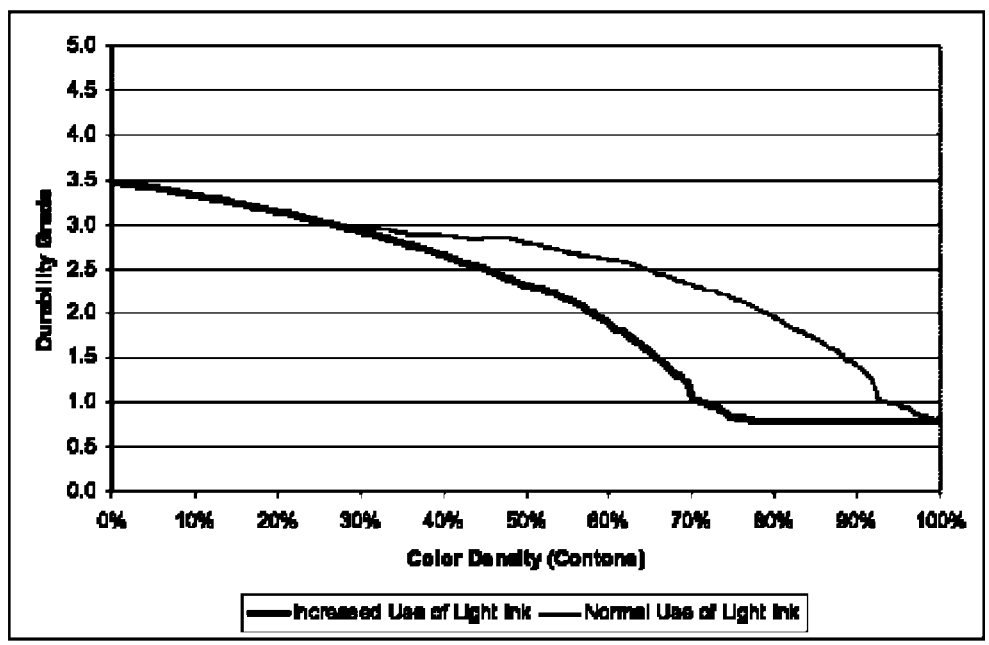
FIG. 2 is a graphical representation of wet rub resistance as a function of color density in accordance with an embodiment of the invention.

A wet rub resistance test was carried out by using a acrylic crockmeter covered with a cloth wetted in a fluid, typically Windex blue glass cleaner. The above treated area was then rubbed with a paper towel wetted with Windex for 6 passes with a stroke length of 2.0 inches, rub speed of 25 cycles/min, and finger loading of 600 g in the inked area. The color loss in the treated sample area and the color transfer to the paper towel were examined visually and a rating of the wet rub resistance was given similar as above on a scale of 0 to 5, 0 being the best and 5 being the worst. The wet rub resistance test results are shown in FIG. 1 as a function of ink loading. As can be seen, the Durability Grade indicated an improvement in wet rub resistance at ink loadings where a second (light) pigment ink was applied in an amount to provide a total ink loading above 10 g/m$^2$. An improvement in Durability Grade indicated an improvement in wet rub resistance in ink loadings using an increased amount of a second (light) pigment ink, as compared to normal usage, is seen in FIG. 2.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An inkjet ink set, comprising:
a first pigment-based inkjet ink having a first colorant load of a pigment and a polymeric latex binder; and
a second pigment-based inkjet ink having a second colorant load of the pigment and a polymeric latex binder, the second colorant load being less than the first colorant load, the second pigment-based inkjet ink configured to be applied to a substrate in an amount to provide a total ink loading of from about 10 g/m$^2$ to about 30 g/m$^2$, the first pigment-based inkjet ink comprising a first colorant load and a first binder load within a range of from about 5 wt % to about 8 wt % and the second pigment-based inkjet ink comprising a second colorant load and a second binder load within a range of from about 2 wt % to about 4 wt %.

2. The inkjet ink set of claim 1, wherein the first and second pigment-based inkjet inks are configured to be applied to a non-absorbing substrate.

3. The inkjet ink set of claim 2, wherein the second pigment-based inkjet ink is configured to be applied over the first pigment based inkjet ink applied on the non-absorbing substrate.

4. The inkjet ink set of claim 1, the non-absorbing substrate comprising one or more of vinyl, polycarbonate, polytetrafluoroethylene (PTFE), polyester, acrylic, polyethylene, polypropylene, polystyrene, cellulose, a metal, a ceramic, or a glass.

5. The inkjet ink set of claim 1, the binder comprising a latex of one or more of conjugated diene copolymer latex, acrylic polymer latex, vinyl-based polymer latex, functional group-modified polymer latex, a polyurethane, or a polyurethane dispersion.

6. The inkjet ink set of claim 5, the latex binder comprising a binder load of from about 2 wt % to about 15 wt % and a binder particle size ranging from about 100 nm to about 300 nm.

7. The inkjet ink set of claim 1, the first pigment inkjet ink comprising a colorant load effective to provide a dark ink and the second pigment inkjet ink comprising a colorant load effective to provide a light ink of the same pigment as the corresponding dark ink.

8. The inkjet ink set of claim 7, the first pigment inkjet ink comprising magenta, cyan, or black and the second pigment inkjet ink comprising light magenta, light cyan, or neutral grey.

9. The inkjet ink set of claim 8, the first pigment inkjet ink comprising magenta having a first colorant load in a range of from about 2.0 wt % to about 4.5 wt % and the second pigment inkjet ink comprising light magenta having a second colorant load sufficient to provide an absorbance maxima with values being measured at a 1:10,000 dilution, ranging from about 0.01 to about 0.03 at a 1:3-1:8 dilution of the first colorant load of magenta ink, at a wavelength maxima ranging from about 520 nm to about 550 nm.

10. The inkjet ink set of claim 8, the first pigment inkjet ink comprising cyan having a first colorant load in the range of from about 1.0 wt % to about 2.5 wt % and the second pigment inkjet ink comprising light cyan having a second colorant load sufficient to provide an absorbance maxima with values being measured at a 1:10,000 dilution, ranging from about 0.01 about 0.03 at a 1:3-1:8 dilution of the first colorant load of magenta ink, at a wavelength maxima ranging from about 600 nm to about 625 nm.

11. The inkjet ink set of claim 8, the first pigment inkjet ink comprising black having a first colorant load of from about 1.0 wt % to about 2.75 wt % and the second pigment inkjet ink comprising tinted grey having a second colorant load sufficient to provide an absorbance maxima with values being measured at a 1:10,000 dilution, ranging from about 0.01 about 0.03 at a 1:3-1:8 dilution of the first colorant load of magenta ink, at a wavelength maxima of about 500 nm.

12. The inkjet ink set of claim 7, the first and second pigment inkjet inks having a pigment particle size of from about 30 nm to about 500 nm.

13. A method of printing an inkjet image comprising:
establishing a non-absorbing substrate;
jetting a first pigment-based inkjet ink having a first colorant load of a pigment and a polymeric latex binder onto the non-absorbing substrate to form a printed image thereon, and
jetting a second pigment-based inkjet ink having a second colorant load of the pigment and a polymeric latex binder onto the non-absorbent substrate to form a printed image thereon, the second pigment-based ink applied in an amount to provide a total ink loading of from about 10 g/m$^2$ to about 30 g/m$^2$, the first pigment-based inkjet ink comprising a first colorant load and a first binder load within a range of from about 5 wt % to about 8 wt % and the second pigment-based inkjet ink comprising a second colorant load and a second binder load within a range of from about 2 wt % to about 4 wt %.

14. The method of claim 13, jetting of the first pigment-based inkjet ink and the second pigment-based inkjet ink occurring sequentially or simultaneously.

15. The method of claim 13, forming a printed image comprising printing the inkjet ink composition using continuous, drop on demand thermal inkjet, piezoelectric inkjet, or combinations thereof.

16. The method of claim 13, the first pigment inkjet ink comprising magenta, cyan, or black and the second pigment inkjet ink comprising light magenta, light cyan, or neutral grey.

17. A durable inkjet ink printed image printed by the method of claim 13.

* * * * *

UNITED STATES PATENT AND TRADEMARK OFFICE
CERTIFICATE OF CORRECTION

PATENT NO. : 8,267,505 B2  
APPLICATION NO. : 12/808076  
DATED : September 18, 2012  
INVENTOR(S) : Jason Jolly et al.

Page 1 of 1

It is certified that error appears in the above-identified patent and that said Letters Patent is hereby corrected as shown below:

On the face page, in field (75), Inventors, in column 1, line 5, delete "Pia," and insert -- Pla, --, therefor.

In column 7, line 3, in Claim 3, delete "non -absorbing" and insert -- non-absorbing --, therefor.

Signed and Sealed this  
Nineteenth Day of March, 2013

Teresa Stanek Rea  
*Acting Director of the United States Patent and Trademark Office*